(12) United States Patent
Whittier et al.

(10) Patent No.: US 12,474,278 B2
(45) Date of Patent: *Nov. 18, 2025

(54) SYSTEMS AND METHODS FOR VISION BASED COUNTING

(71) Applicant: Illinois Tool Works Inc., Glenview, IL (US)

(72) Inventors: Ben Whittier, St. Peter, MN (US); Eric Holland, Lake Crystal, MN (US); Dave Lang, Commerce, MI (US); Kevin Detert, Fairmont, MN (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/773,805

(22) Filed: Jul. 16, 2024

(65) Prior Publication Data

US 2024/0369497 A1 Nov. 7, 2024

Related U.S. Application Data

(63) Continuation of application No. 16/925,061, filed on Jul. 9, 2020, now Pat. No. 12,038,390.

(Continued)

(51) Int. Cl.
*G01N 21/95* (2006.01)
*A61J 7/02* (2006.01)
(Continued)

(52) U.S. Cl.
CPC ............ *G01N 21/9508* (2013.01); *A61J 7/02* (2013.01); *G01N 21/8806* (2013.01);
(Continued)

(58) Field of Classification Search
USPC .......................... 382/100, 128, 141; 414/675
See application file for complete search history.

(56) References Cited

U.S. PATENT DOCUMENTS

| | | | | |
|---|---|---|---|---|
| 6,610,973 B1 * | 8/2003 | Davis, III | ................. | A61J 7/02 250/222.1 |
| 8,215,557 B1 * | 7/2012 | Reno | ................... | G06K 7/10811 235/462.13 |

(Continued)

OTHER PUBLICATIONS

Int'l Search Report and Written Opinion AppIn No. PCT/US2020/043945 mailed Nov. 24, 2020.

(Continued)

*Primary Examiner* — Ishrat I Sherali
(74) *Attorney, Agent, or Firm* — McAndrews, Held & Malloy, Ltd.

(57) ABSTRACT

Disclosed are image based counting systems and methods. Image based counting systems and methods employ one or more imaging devices (e.g., one or more color cameras) and one or more illumination devices (e.g., one or more illumination sources to provide variable and/or dynamic lighting). In some examples, the image based counting system provides illumination to a tray upon which one or more items (e.g., pills) are placed. The illuminated items are then imaged by the one or more imaging devices based on one or more imaging techniques or processes to determine and/or present information associated with one or more properties of the item.

18 Claims, 10 Drawing Sheets

Related U.S. Application Data

(60) Provisional application No. 62/890,749, filed on Aug. 23, 2019.

(51) Int. Cl.
  *G01N 21/88* (2006.01)
  *G06M 1/10* (2006.01)
  *G06T 7/73* (2017.01)
  *G06V 10/56* (2022.01)
  *G06V 10/60* (2022.01)
  *G06V 20/52* (2022.01)

(52) U.S. Cl.
  CPC ............ *G06M 1/101* (2013.01); *G06T 7/74* (2017.01); *G06V 10/56* (2022.01); *G06V 10/60* (2022.01); *G06V 20/52* (2022.01); *G06T 2207/10148* (2013.01); *G06T 2207/10152* (2013.01); *G06T 2207/30242* (2013.01)

(56) References Cited

U.S. PATENT DOCUMENTS

| | | | |
|---|---|---|---|
| 10,498,941 B2 | 12/2019 | Rhoads | |
| 12,038,390 B2* | 7/2024 | Whittier | G06V 10/60 |
| 2006/0045323 A1 | 3/2006 | Ateya | |
| 2007/0189597 A1* | 8/2007 | Limer | A61J 7/02 |
| | | | 382/128 |

OTHER PUBLICATIONS

Int'l Preliminary Report on Patentability Appln No. PCT/US2020/043945 mailed Mar. 3, 2022.

* cited by examiner

SYSTEMS AND METHODS FOR VISION BASED COUNTING

CROSS REFERENCE TO RELATED APPLICATIONS

This application is a continuation application of U.S. patent application Ser. No. 16/925,061, entitled "SYSTEMS AND METHODS FOR VISION BASED COUNTING," filed Jul. 7, 2020, which claims priority from and the benefit of U.S. Provisional Patent Application Ser. No. 62/890,749, entitled "SYSTEMS AND METHODS FOR VISION BASED COUNTING," filed Aug. 23, 2019, both of which are hereby incorporated by reference in their entireties for all purposes.

BACKGROUND

There are a variety of ways to process a pharmaceutical order, such as manually counting pills and/or employing weighing and counting scales. The conventional approaches can be slow and cumbersome, and provide limited additional information to an operator, which can cause count and process errors.

Tradeoffs in using known weight-based can include control of contamination, management of detected unit defects such as fragments of various sizes, and calibration requirements. While weight-based systems require periodic calibration to ensure accuracy, optical systems are substantially insensitive to drift characteristic of weight transducers. This may be offset by size and cost considerations, wherein pour through optical systems demand comparatively heavy use to justify the resource commitment involved.

Accordingly, there is a need for a counting system for pharmacy and other applications that integrates a machine-vision-based unit detector with associated control and message management functions.

SUMMARY

The present disclosure relates generally to image based counting systems and methods. In particular, the image based counting systems and methods employ one or more imaging devices, such as color cameras, and one or more illumination devices with variable and/or dynamic lighting capabilities.

DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Where appropriate, similar or identical reference numbers are used to refer to similar or identical components.

DETAILED DESCRIPTION

Figure 1:
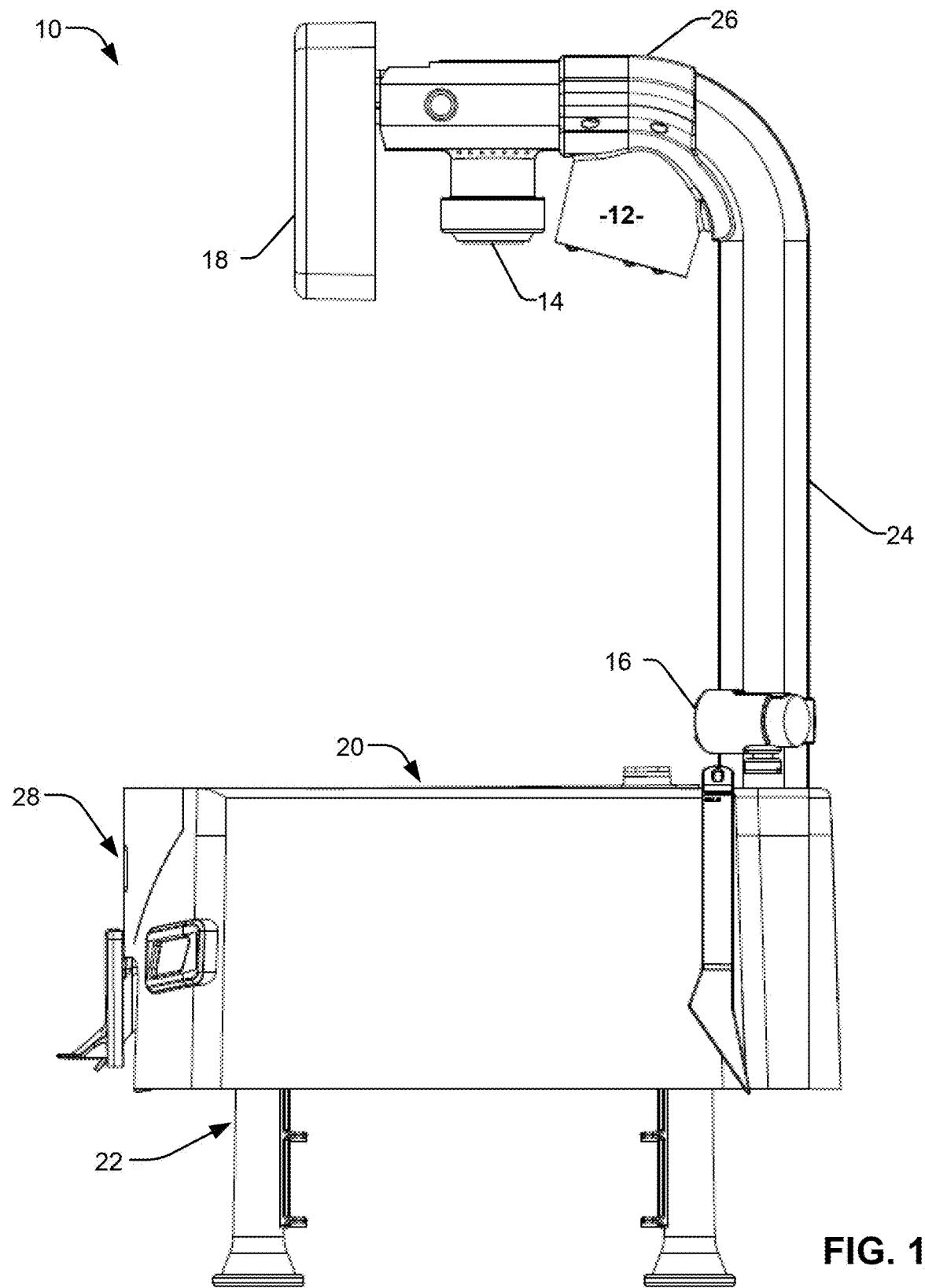
FIGS. 1 and 2 illustrate an example image based counting system, in accordance with aspects of this disclosure.

The present disclosure is directed to image based counting systems and methods generally. In particular, an image based counting systems and methods employ one or more imaging devices (e.g., one or more color cameras) and one or more illumination devices (e.g., one or more illumination sources to provide variable and/or dynamic lighting). In some examples, the image based counting system provides illumination to a tray upon which one or more items (e.g., pills, capsules, pharmaceutical units, items for medical use, etc.) are placed. The illuminated items are then imaged by the one or more imaging devices based on one or more imaging techniques or processes to determine and/or present information associated with one or more properties of the item.

Additionally or alternatively, the lighting itself can be provided with a variety of techniques. In some examples, the lighting can be provided at one or more discrete wavelengths (e.g., a monochromatic light), one or more specific illumination types (e.g., an infrared (IR) light), one or more patterns (e.g., application of one or more illumination techniques over time), one or more sequences (e.g., application of one or more illumination techniques over time).

In some examples, the applied illumination technique(s) and/or imagining techniques may change dynamically over time and/or over the area to be imaged. In such cases, the changes in provision and/or capture of the illumination may be recognized by the system to provide multiple views of the items, focus on different characteristics of the items. In examples, application of the light can vary by changing an angle of incidence of the light, a color of the light, an intensity of the light, an area of application (e.g., spot size) of the light, etc. Thus, the items can be imaged differently, even if the arrangement of the items is unchanged (e.g., the items lay static on the tray). The illumination effects can therefore create or eliminate shadows and/or highlight or subdue color contrast, to more completely and accurately image the items.

In some examples, the imaging techniques include capturing a time series of images and generating a video representing the images in sequence (e.g., a graphics interchange format (GIF)). For example, the video can be provided as a multi-frame video (e.g., containing a 5-6 frame video) instead of a static image. Thus, the system employs dynamic lighting and/or imaging techniques (e.g., stop-frame image capture, selective and dynamic focus) to capture multiple images within a short period of time. In some examples, the images are taken from a single view point, whereas in other examples the images appear to be taken from different angles (e.g., employing variable focusing techniques, such as adjusting focus of an oil filled lens, described below). Such imaging techniques can present the tray and/or item in a variety of views, to represent what a pharmacist would see if moving or rotating the tray.

Applying an optical filter to present the imaged pills under various conditions, such that the filters are designed to accentuate one or more particular properties of the item. In some examples, the properties include a color, a shape, a size, a printed or embedded marking, an orientation, etc.

Disclosed herein is an example image based counting system. In some examples, a frame is provided with a tray mounted thereon to hold the items to be counted. An imaging device (e.g., one or more color cameras) can be mounted to the frame to image the tray and the contents thereon. The tray and items can be illuminated by one or more illumination devices. In some examples, an illumination device is co-located with one or more of the imaging devices.

Additionally, a supplemental imaging device can be employed to capture information about supplemental items not placed on the tray. For example, the supplemental imaging device can be used to capture information from a container that brought the item to the tray, a container to carry away the items, information for the item (e.g., the pill bottle).

A user interface can be mounted to the frame used to present information to an operator (e.g., a medical professional, such as a pharmacist or pharmacy technician), and/or receive instructions from the operator. The user interface can include a display to present information about the item, such as number of items on the tray, one or more properties of the item.

For example, camera mounted above the counting platter captures photo images used to count pills five times per second. While faster prescription filling is a tangible benefit of the disclosed system, the value obtained with a high degree of count accuracy provides a substantial benefits over conventional systems. Thus, patients receive medication quickly, and pharmacy staff mitigate inventory shrinkage due to over-fills or other errors. Customer satisfaction improves as a result. Further, a vision based system is configured to identify foreign substances and/or broken pills on the tray. The open design of the counting system further assures the pills are in view of the user, and also provides fast and efficient cleaning.

These multi-chromatic cameras will provide color images of the items on the tray (e.g., pills), items within the vial, as well as an image of a vial label (e.g., from the supplemental imaging device). The captured images can be employed to capture and/or verify information related to the order, such as verification of the number items for the order, to identify foreign substances (e.g., non-pill items) on the tray, incorrect items (e.g., by identifying a property of an item that conflicts with a known property of the desired item), and/or broken or otherwise damaged items.

In disclosed examples, a system for processing a pharmaceutical order includes a platform to hold one or more pharmaceutical pills. A lighting source illuminates the platform and pills with a plurality of illumination characteristics. One or more imaging devices captures the illuminated platform and pills. A controller receives images of the illuminated platform and pills from the one or more imaging devices, identifies a characteristic of the plurality of illumination characteristics, compares the characteristic to a list of illumination characteristics that corresponds to a property of the pill, determines a property of the pill based on the comparison, and generate an alert associated with the property.

In some examples, the system includes an adjustable focus lens, such that the controller controls the lens to capture images at a first preprogrammed fixed-focus setting. In examples, the first preprogrammed fixed-focus setting corresponds to a location on the platform. In examples, the system includes a dispensing funnel, the controller to control the lens to capture images at a second preprogrammed fixed-focus setting corresponding to a location on the dispensing funnel.

In some examples, the controller controls the lens to adjust the focus of the lens to capture images at a plurality of variable focal distances. In examples, the plurality of illumination characteristics includes one or more of an intensity, a wavelength, or a distribution pattern. In some examples, the plurality of illumination characteristics comprises one or more of a color, a shape, a size, a printed or embedded marking, or an orientation.

Figure 2:
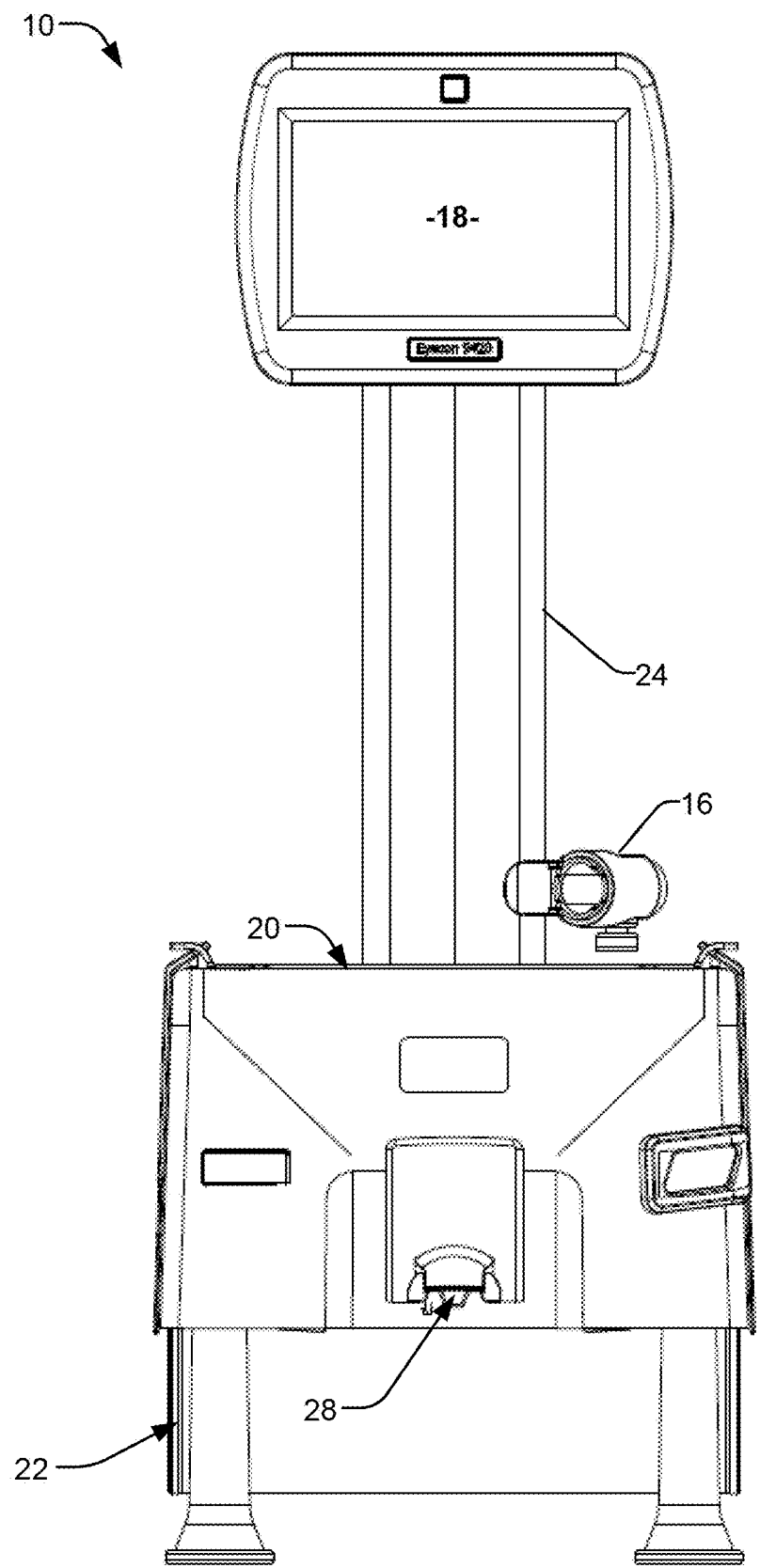

FIGS. 1 and 2 illustrate an example image based counting system, in accordance with aspects of this disclosure. As shown in FIG. 1, the imaging system 12 is mounted to arm 24 via one or more attachments 26. The imaging system 12 can include an illumination device and/or a color camera, one or both of which can be angled to capture images of the tray 20, a dispensing funnel 28, and/or other areas within the vicinity of the system 10. Capturing and processing images can be employed to identify and/or prevent errors, such as cross-contamination of different items, such as when a pill from a previous order remains on the tray and/or the funnel after an order has been filled.

In some examples, a supplemental imaging device 16 can be provided, such as mounted to the frame 22, employed to capture information related to the order, such as vial label information. In some examples, supplemental imaging device 16 is removable for mounting on a different location on the frame 22, another location separate from the frame 22, and/or provided as a handheld or otherwise portable imaging device linked to the system 10 via one or more communication links (e.g., via wired and/or wireless data transfer channels and/or protocols). Additionally or alternatively, the supplemental imaging device 16 can be employed to capture images of an area outside the field of view of the imaging system 12 and the imaging device 14.

Figure 3:
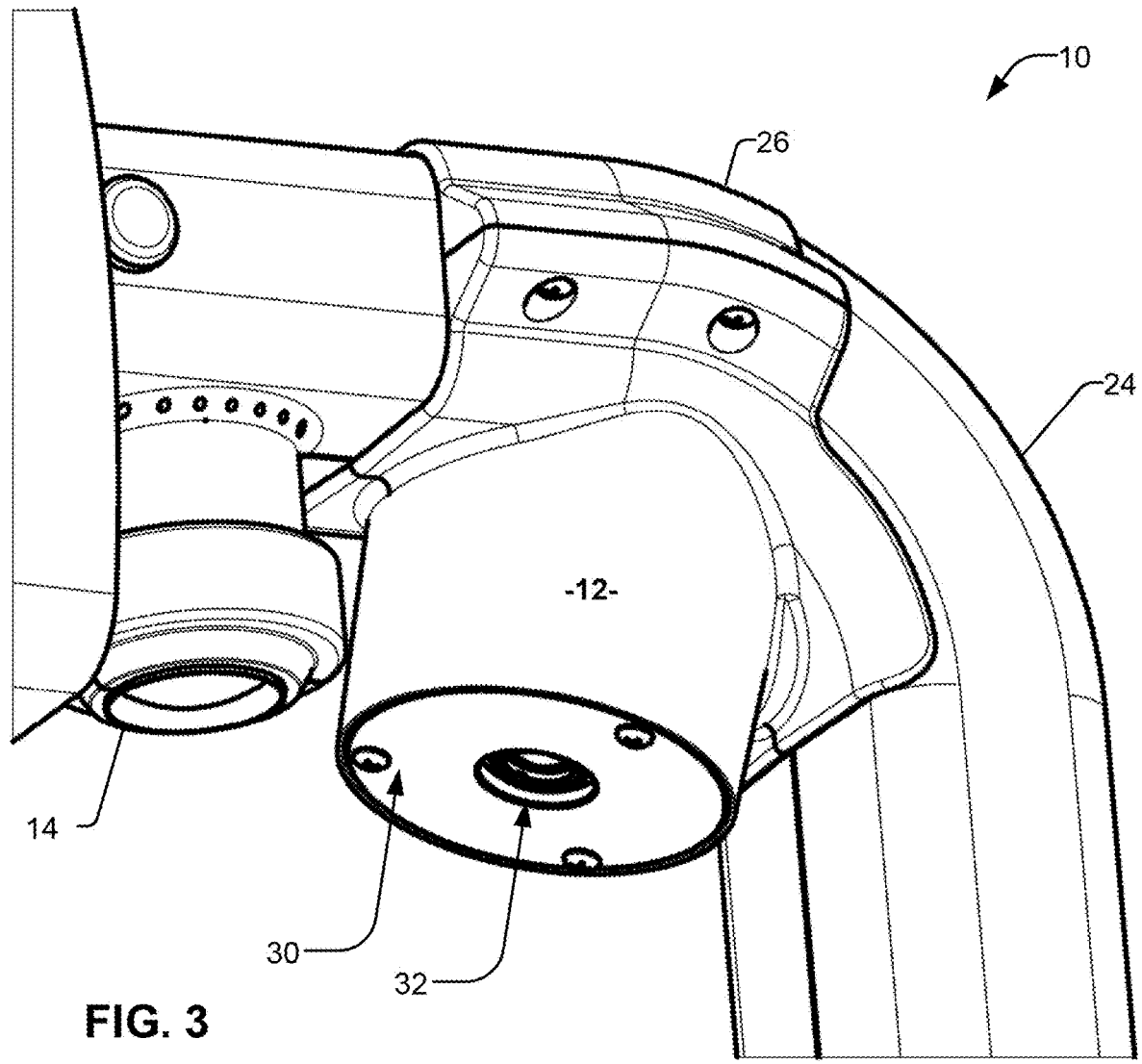
FIGS. 3 and 4 illustrate focused views of an example image based counting system, in accordance with aspects of this disclosure.
Figure 4:
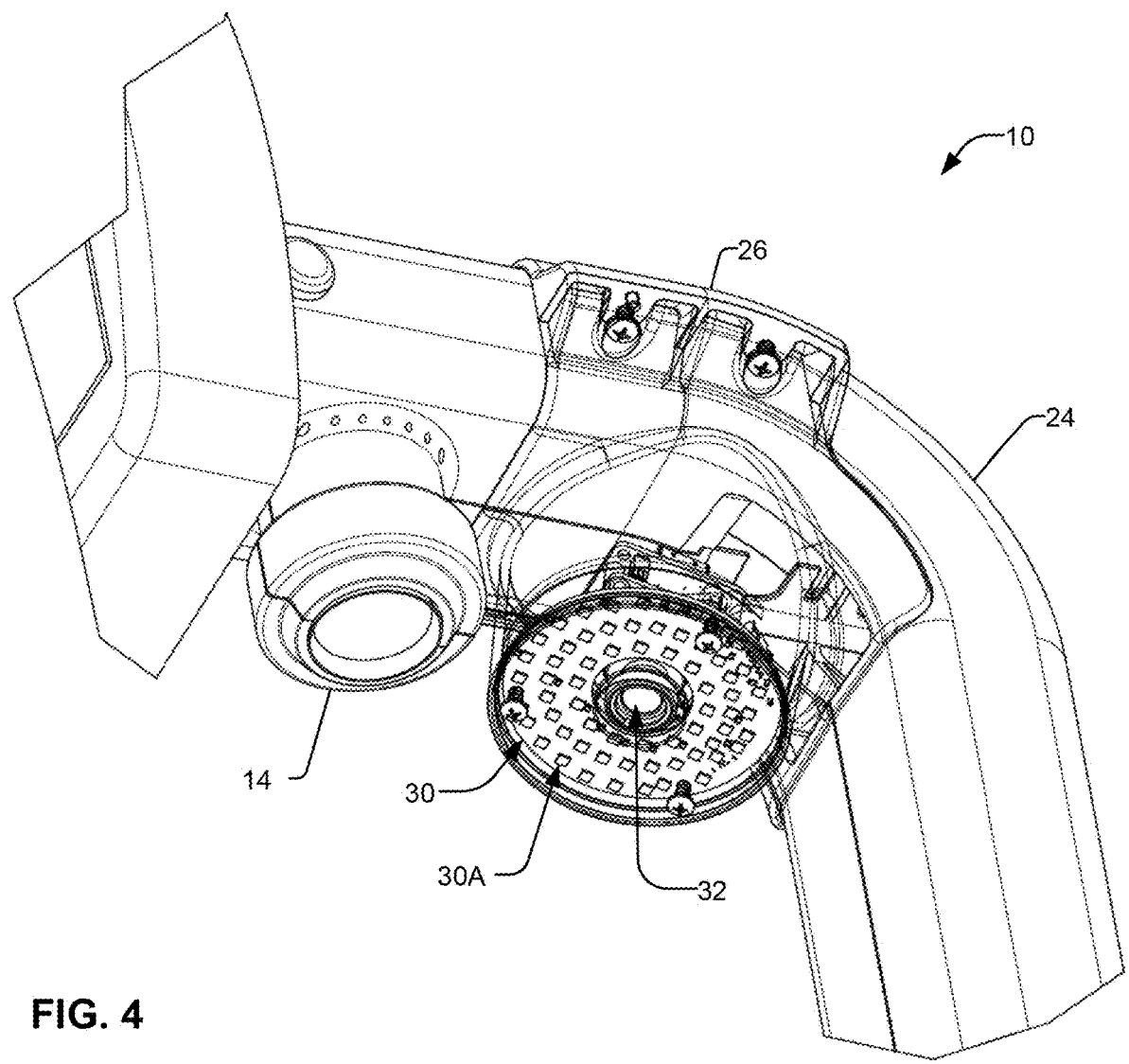

As shown in FIGS. 3 and 4, the imaging system 12 can include an internal imaging device 32 with one or more lenses to capture images of the items to be counted. One or more LEDs 30A can be included, such as mounted on an LED mount or board 30. For example, the lens of the internal imaging device 32 is arranged to have an unobstructed optical path to the imaged area (e.g., the tray 20), such as arranging the lens on the level as the LED board 30.

In some examples, the imaging device 32 is designed to operate with dynamic focus employing a "liquid lens" which is a particular type of lens defined by an oil-filled container configured to change shape in response to a voltage applied at one or more locations of the container. By changing the voltage applied to the container, the focus of the lens is adjusted without any mechanical movement of the lens. The lens focus is controlled by the computing device.

In other examples, the lens can be any type of optical magnification device, including flat lenses, diffraction gratings, gradient index lenses, compound lenses, adjustable lenses, including photoreceptors and or other signal capturing mechanisms.

In some examples, the imaging device 32 is installed from a top opening of the system 12 enclosure (e.g., removable mount and enclosure 26) and the LED board 30 are installed coming in from the bottom of the enclosure. In examples, an LED diffusor and/or one or more filters are provided to enhance image capture. Slots can be located in the enclosure 26 to accommodate cabling to other components to ensure synchronization of various functions.

In disclosed examples, the system 10 is configured to provide lighting dynamically from at least light source 30 controlled to enhance properties of the items (e.g., markings, imprints, colors, shapes, etc.) on the items being counted by the system 10. For example, the illumination can be provided by mechanical rotation of a light source (e.g., LED board 30), and/or selectively activating one or more light (e.g., LEDs 30A arranged on one or more surfaces directed toward the item to be imaged). These techniques aid in distinguishing and/or identifying properties of the imaged items.

In examples, the light source 30 employs an LED PC board with a plurality of LED lights 30A (e.g., 64 cool white (6500K) LEDs). In some examples, the LEDs 30A are arranged in a 16 strings of 4 LEDs each. Each LED and LED string has separate controls to turn the respective LEDs on, off, adjust the intensity of the light via a PWM control signal.

The strings are arranged in a distributed (e.g., pinwheel) layout, such that effects of rotational lighting can be implemented to highlight features of the imaged item. Thus, the illumination can be applied directly to the surface/item to be imaged, indirectly provided by reflecting from one or more surfaces or through a diffuser. Further, all lights may be illuminated based on a dynamic time or intensity sequence, and/or provided via different angles. In some examples, the LED board is controlled via USB (HID driver) and powered via a 12 VDC cable from the DC PSU.

In some examples, the one or more imaging devices can employ an adjustable and/or auto-focus feature to expand the imaging capabilities. For instance, imaging device 32 may include a factory-programmed fixed-focus setting for imaging static images at a fixed distance or within a distance threshold, such as pills located on the tray 20. Additionally, the imaging device 32 can employ an auto-focus feature for filling a container (such as for unit-of-use images). This provides consistent, high-resolution images of the items/pills, while providing flexibly for the system 10 to capture images of larger unit-of-use items placed on the tray or located away from the tray.

In some examples, the imaging device 32 has a fixed focus for imaging the tray 20 (which is generally fixed position in the frame 22), and provide an autofocus feature for container imaging and/or unit-of-use items.

The prescription filling process involves capturing images of the pills on the tray 20, containers filled with the pills, and images of the funnel 28. Each image can be captured by employing different lighting techniques to enhance one or more visual properties of the pills being imaged.

Capturing images without hotspots aids in analyzing pill markings and/or imprints, as well as enhancing color neutral image data of the pills. When capturing photos of filled containers, a spotlight can be employed to fully illuminate the pills inside. Depending on how full the container is and the color of the pill the amount of lighting needs to be adjusted to prevent intense light or dim light from fully imaging the contents. The system 10 is configured to scan the stock number of the container and/or pill, providing information to the operator (such as the National Drug Code (NDC)), which informs the system 10 of the color, size and shape of the pill, which the system 10 uses to adjust the lighting of the filled container. In some examples, information is displayed on user interface 18 as images and/or text from one or more relevant databases (e.g., stored in memory, accessed from a list of information such as maintained by a governmental body, etc.). Presentation of this information aids in the operator comparing and/or validating the pills in the order being filled with associated information from the one or more databases.

Once a record of the processed order is created, data management can be updated based on the imaged items and the collected information. For instance, color photos can be used as evidence to assist in proper and efficient order filling. In some examples, the system 10 is connected to a network, which provides a link to a remote computing platform. Through this connection, a remote system or individual, such as a pharmacist, can review a process order being performed in a distant location.

Fixed focus cameras allow for consistent pill images, but due to depth of field struggle with capturing quality images of filled pill vials and large unit-of-use items. Autofocus cameras do not always focus well on pill images and require intervention at times to get them to focus correctly on the pills. Having the ability to have both a fixed focus and autofocusing capability in this application allows for the highest quality photos throughout the prescription filling process.

Providing color photos of the pills, filled vial, and vial label allow the pharmacist to review and approve prescriptions without being directly in the filling workflow. This allows for better pharmacist utilization and opens up the possibility of using remote pharmacists.

Figure 5A:
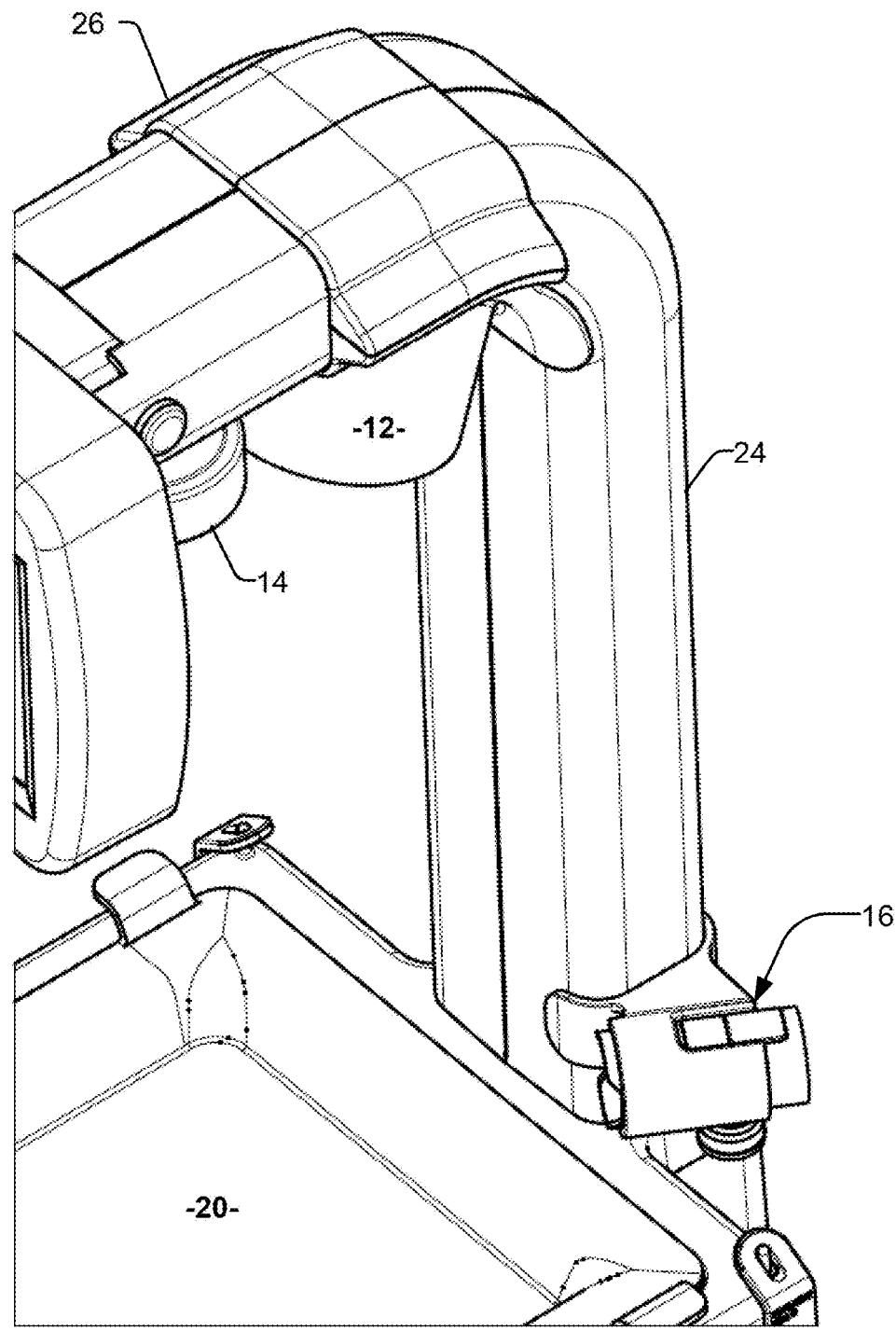
FIG. 5A illustrates an example perspective view of an example image based counting system, in accordance with aspects of this disclosure.

In some examples, as shown in FIG. 5A, the supplemental imaging device 16 can be mounted to the frame 22 to image items that are not resting on the tray 20 or funnel 28. This can include a container for the items, information sources to be inputted/scanned into the system, or other items for recordation. In some examples, a handheld or otherwise remote supplemental image device 16 can be employed, such as to image large unit-of-use items too large for the tray 20.

Figure 5B:
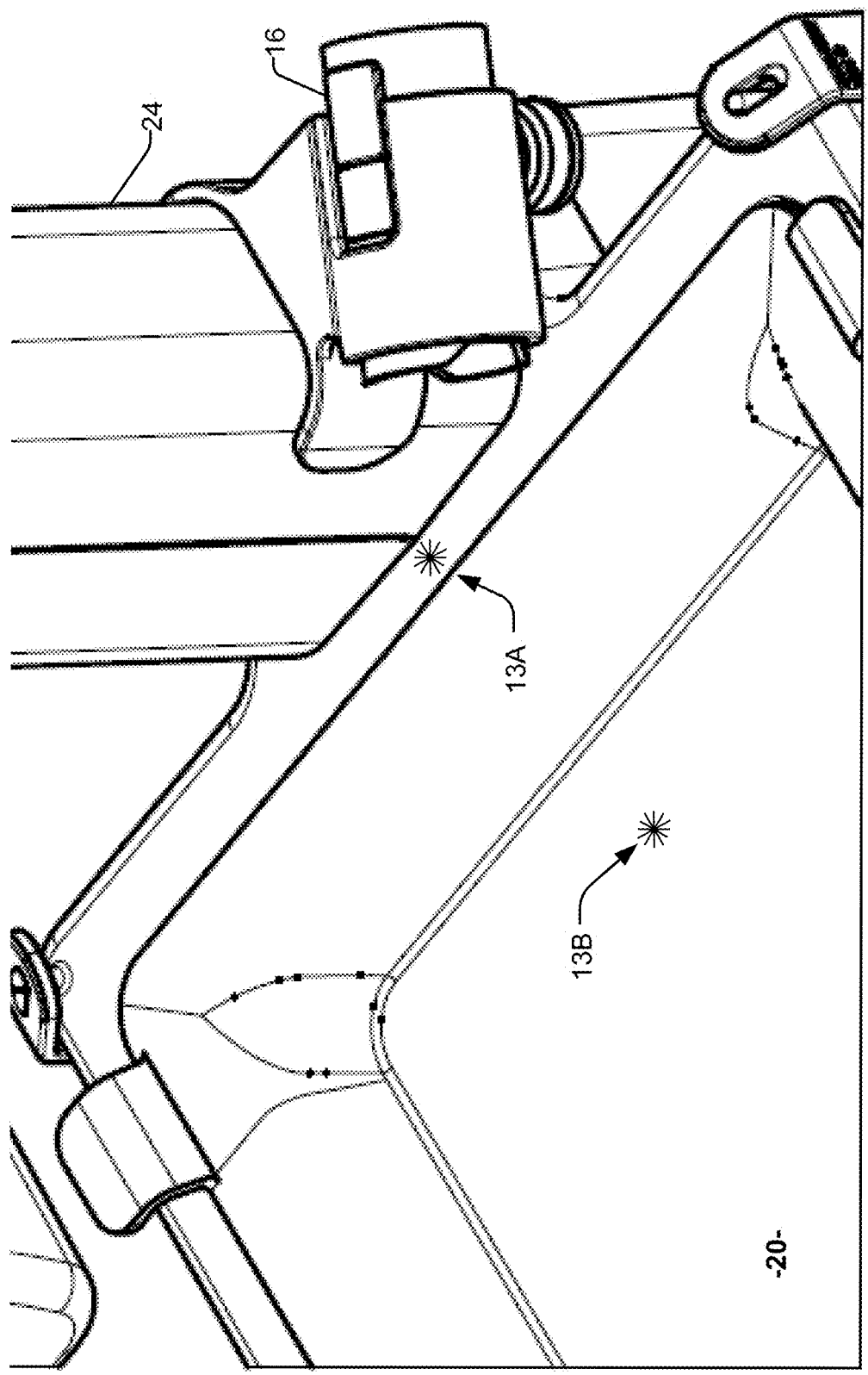
FIG. 5B illustrates an example perspective view of an example image based counting system that includes a calibration device, in accordance with aspects of this disclosure.

In some additional or alternative examples, as shown in FIG. 5B an image based counting system includes one or more calibration devices 13A or 13B. The calibration devices 13A or 13B may include graphics and/or text, and may be a passive indication (e.g., a high contrast static indicia, such as a printed, stamped, and/or otherwise integrated) or a dynamic indication (e.g., illuminated, pulsed, provided in a computer controlled display). One or more calibration devices may be arranged on one or more surfaces of the system 10. As shown in FIG. 5B, example calibration device 13A is arranged on a ledge at the base of arm 24, and calibration device 13B is arranged on tray 20, each within the field of view of one or more of the imaging system 12, imaging device 16, and imaging device 14.

The relevant image capture device may capture images of the calibration device 13A or calibration device 13B during an initial and/or periodic calibration process. The captured images may then be compared against one or more reference images, and/or may be digitized or otherwise reformatted, to provide information to processing circuitry to control a focus of the relevant image capture device.

Figure 6:
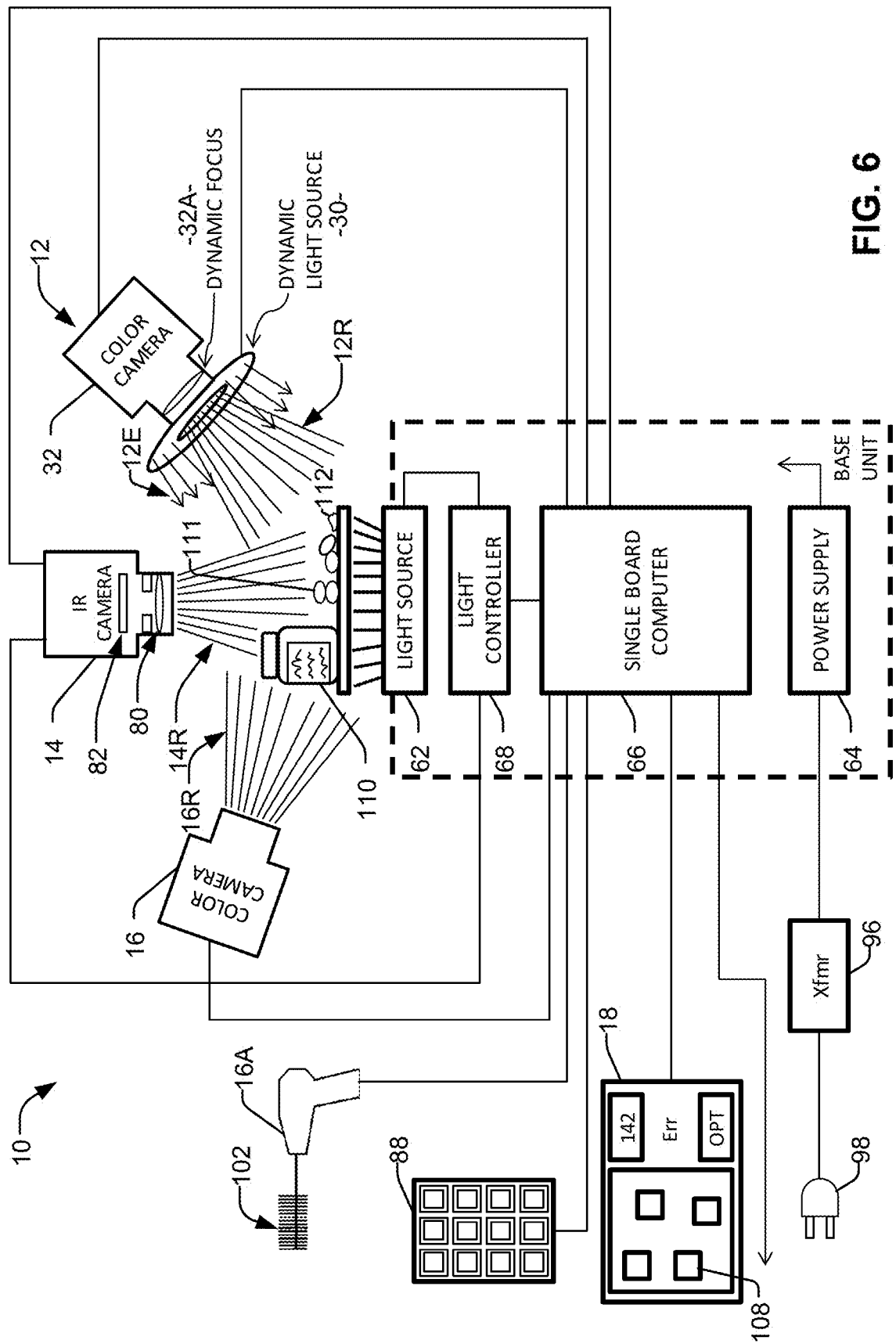
FIG. 6 illustrates a block diagram of an example image based counting system, in accordance with aspects of this disclosure.

FIG. 6 shows a system 10, substantially as disclosed with respect to FIGS. 1-5. In some examples, the system 10 includes imaging system 10, which includes illumination device 30 to provide illumination 12E, which may be polychromatic or monochromatic light, and imaging device 32 to receive illumination 12R reflected from items or pills 111 and/or components of the system 10 via dynamic focus 32A (e.g., a liquid lens). Imaging device 16 similarly captures illumination 16R, similar to illumination 12R. Imaging device 14 is configured to capture infrared (IR) light, which may come from light source 30 and/or light source 62, described below.

In some examples, illumination device 30 includes an array of light emitting diode (LED) devices 30A affixed to imaging system 12 to provide dynamic illumination. In some examples, the LEDs 30A can function as a distributed illumination source, whereas in other examples the illumination can serve as a point source. In examples, the illumination can be distributed and/or directed by a lens, a focusing reflector, or other type of optical elements.

In addition to the multi-color images captured by one or both of the imaging system 12 and imaging device 16, imaging device 14 can capture multi-color images as well as images in the infrared (IR) range.

As shown in the block diagram, one or more light sources 62 powered from a power supply 64 with timing controlled from a processor module 66, to control illumination and capture of images to present to an operator, such as via user interface 18.

Illumination may be of multiple wavelengths, such as white light. One or more downward-directed illumination sources, such as, for example, ambient room light or a light source at imaging system 12 (shown also as source 30 and imaging device 32 in FIGS. 4 and 5), may capture one or more properties of the pills 111 in addition to quantity and/or shape to be detected, such as color, transparency, imprint symbols, etc. In examples having a plurality of light sources and/or a source emitting a plurality of colors, reflected light in addition to or in place of silhouette illumination may be detected. Such capability may in some examples permit or enhance detection of flawed or incorrect items 112 in a sample, for example. The imaging devices 14, 16, 32, may acquire a reference brightness level when the tray 20 is empty, and then use the reference level to establish contrast levels during counting.

Contrast between the appearance of the surface of the tray 20 and of the pills 111 being counted may be further enhanced, particularly in a high ambient light level or broad-spectrum light environment, by positioning one or more filters having properties suitable for limiting light impinging on a detector to spectral elements of interest. For an infrared source 62 illuminating a detector 82 that is insensitive and thus self-filtering for spectral elements longer in wavelength than the far infrared, an infrared low pass filter may be used, while for examples wherein multiple spectral elements are to be detected, combinations of low pass and/or band blocking (notch) filters may be used. It is to be understood that a single filter combining multiple notch filters and bandpass or lowpass filters may be used in some examples. In some examples, imaging system 12 and/or imaging device 16 employs one or more filters to capture light in one or more wavelengths, including IR.

In examples using strobing, synchronization by a sync signal may be directed from a relevant circuit element such as the processor 66 or the power control module 68 to the imaging devices 14, 16, 32. Applying the sync signal to the imaging devices 14, 16, 32 allows image acquisition to be synchronized to the availability of light from the associated illumination source. The strobe function can reduce energy flux and gradient into the pills to be counted, thereby impeding degradation for some heat-sensitive, light-sensitive, or short-life medications or packaging configurations.

Some light sources provide a substantially uniform areal brightness distribution, and further provide rapid turn-on and turn-off of emission. Other light sources may provide illumination compatible with data acquisition properties of specific types of detectors. For example, a detector 82 may intrinsically perform raster scanning over an image area, that is, acquire data from an array of picture elements by sequentially reading instantaneous brightness values from the elements, getting a succession of values across a single row of the detector 82, then advancing to the next row and repeating the process. For such a detector, only an area of the source optically focused on the portion of the detector being read need be activated, further reducing power consumption and emission. For another type of detector, the entire detector surface may be illuminated and may capture an image in the form of electrical charge on discrete picture elements, after which the image may be transferred by a process such as "bucket brigade" charge transfer with the relatively low brightness of reflected ambient light continuing to impinge. For this latter type of detector, a uniform illumination pulse over the surface of the source may be used.

In some examples, light emission may be substantially randomly provided in phase and direction. For source 30 examples having comparatively uniform emission distribution over the surface of the source 30, or having comparatively uniform areal intensity striking the imaging devices 14, 16, 32, signal processing may be simplified compared to signal processing required for sources having pronouncedly non-uniform emission. In examples having less uniformity, either over the source surface or over apparatus lifetime, a baseline surface mapping can be established and refreshed periodically as appropriate, to precompensate for source variation.

Furthermore, in some examples, adjusting emission intensity or emission pulse duration can be used to regulate signal input level into the imaging devices 14, 16, 32, to remain within a range. In some examples, the imaging devices 14, 16, 32, may allow the respective detector sensitivity to be controlled over portions of the image area of the imaging system, such that precompensation for source areal intensity variation may be performed prior to providing the image information from the imaging devices to the processor 66. Similarly, impinging light may be regulated or switched using a mechanical or electrochromic shutter.

In some examples including a discretely identifiable illumination source power control module 68, emits radiation, such as infrared light, that passes through a stage and is blocked in part by pills 111. A portion of the unblocked radiation can be captured by one or more imaging device 14. For example, imaging device 14 includes a focusing mechanism 80 such as a pinhole or a lens to place an image in the form of silhouettes of the pills 111 on a detector 82, functioning as a machine vision transducer. The detector 82 couples the image in a transferable format such as a digital data stream to the processor module 66. The image is coupled via a power and communication link such as a power-carrying electrical data signal cable or a combined power cable and fiber optic link. The processor module 66 further interprets the images to generate a count of pills 111 at periodic intervals. This count may be presented on a display component 18, and may be updated at a rate determined by a control routine stored within the processor module 66 or determined by input from a user, for example.

In some examples, another supplemental imaging device 16A may be included to capture additional data, such as to read a barcode 102.

The illumination source 62 may, in some examples, provide electromagnetic energy in the form of infrared light at low average intensity and with a time-controlled, low duty cycle emission envelope. Where so implemented, the radiative intensity can be "strobed," that is, pulses of light can be emitted having a selected rate, duration, and emission intensity envelope. In strobed configurations, overall emission may be substantially lower than would be the case were the illumination source 62 operated continuously at an emission level compatible with a particular imaging device. This may, in some examples, allow a high enough illumination level for efficient operation of the particular imaging device, while lowering the net power radiated and/or conducted downward into any electronic devices housed below the source 62. This can in turn reduce component stress, extend component life, reduce overall power consumption and power supply size and weight, and/or reduce tendencies for susceptible components to drift in value with temperature. Strobe capability may further allow operation without a cooling/air distribution fan in some examples. A low duty cycle, high intensity backlight may also serve to reduce the effects of any ambient light that might otherwise make pills appear less dark as a result of their being illuminated on their top (camera illuminated) side.

Additional functions of the system 10 may include provision for local control input using a keypad 88. Example keypads 88 may have the form of a touchpad overlay, such as an array of substantially transparent pressure transducers or a functionally equivalent device, providing output usable in place of pushbutton switch contacts, with the touchpad superimposed on the display component 18. Some examples may include one or more external communication links, whereby, for example, the system 10 may communicate with a remote processor and/or transmit and/or receive instructions or data for a particular operation.

Illumination using energy other than infrared and visible light may be used in some examples. Within the electromagnetic (EM) spectrum, microwave radiation (i.e., EM waves longer than infrared) may provide adequate resolution in some examples, while ultraviolet light (UV, EM above visible) or x-rays may be usable in other examples. Acoustical energy, such as ultrasonic emission, can have wave dimensions and power levels permitting acquisition of an image of a stage whereon a number of countable units are placed, with sufficiently high resolution and image refresh rate to meet system needs. Still other imaging methods and media may likewise be applicable in some examples.

In some examples, various images corresponding to various perspectives and/or wavelengths, may be incorporated into a composite image to illustrate various characteristics of the imaged items. The composite image may include a silhouetted outline of the item (e.g., from a backlit light source in a first wavelength), as well as graphics, text, and/or color on the item (e.g., from light in a second wavelength that is reflected form a surface of the item). The resulting composite image therefore provides more information than a single image captured from a single wavelength and/or perspective.

Power for operating the system 10 may be self-contained, using some combination of replaceable, rechargeable, and/or solar batteries included in the power supply function 64, may be externally powered using direct or indirect (such as from an external transformer 96) feed from a premises wiring plug 98, or may be otherwise energized, as selected for a particular use.

Illumination source 30 may be diffuse, that is, may have largely uniform and low energy density emission over a relatively broad surface, or may approximate a point source, that is, may emit with comparatively high energy density from a small spot. Each such configuration, as well as intermediate forms such as multiple discrete spot sources, may be superior in conjunction with particular imaging methods.

For some examples, a passive reflector can be used to reflect light from the source back to the imaging device, with deflection or diffusion of the light by the pills 111 providing contrast.

The last examples could require an adaptation of the processor 66 algorithm to account for discrete specular reflections from gel pills, coated pills, and other shiny unit surfaces, for example. Similarly, variations in reflectivity of subject units may require added camera bit depth or processor algorithmic complexity in some such examples.

In still other examples, comparable resolution and speed may be achieved using a narrow, directable spot of light, such as a laser beam within the illumination source 30, directed over an area using a Micro Electro Mechanical System (MEMS) or another beam steering system. In such an example, the beam is scanned over the stage, and the scan result is detected by an imaging device that can be as simple as an unfocused single-element photodetector. Such an example may use silhouette, reflection, or combined imaging, and may use a plurality of light sources of different wavelengths. The analytical algorithm for evaluating an image so acquired, discussed below, may also be adapted, such as by performing a low-resolution scan with the beam to find unit candidates, then edge tracing or rescanning at higher resolution to evaluate areas of interest. The process may further vary spot size.

In some examples, an areal counting function may be executed repeatedly at selected intervals, with count results on the display 18 then updated, for example after completion of each count. For sufficiently rapid count intervals, such as multiple times per second, the update rate may appear to a user to be essentially continuous. As an operational consideration, such a process may allow a dispensing mechanism to pour out units onto the tray 20, for example, until an approximately correct count is seen on the display 18. The dispensing mechanism can then verify that no piles obscuring observation are present on the tray 20, and can redistribute the units if necessary, with the results presented effectively instantaneously at each step.

In some examples, in addition to providing a count of discretely identifiable units interrupting illumination over several consecutive scan lines at a broadly uniform position with reference to a first end of the scan lines, a processor 66 may provide an inspection function. That is, the processor 66 may be configured to anticipate the approximate areal coverage or "blob size" of the units being counted, and to determine for each discretely identifiable unit whether the size generally corresponds to that expected for such a unit, in consideration of a range of orientations of the unit. Thus, for example, where unit size is too small to be consistent with any anticipated orientation for that unit, the unit may be tagged as possibly chipped or a fragment. Similarly, where a unit occupies a large enough region but shows a shape that is non-uniform, exceeds a stipulated range of rates of curvature, or otherwise exceeds geometric model limits, the unit may be tagged as possibly defective. Such information may be presented on the display 18, variously in text form or as a graphical image 108 showing the general location of a suspected fragment 112. Fragments below a stipulated size may be ignored in some examples.

Compound element images may be identified as multiple discrete units through application of geometric pattern matching functions. Where predefined or other geometric patterns can be detected within a compound element image, the patterns can be classed as units within the image. The patterns defined by these units may be, in effect, subtracted from the image, leaving the areas obscured by the patterns indeterminate, i.e., classed as neither illuminated nor part of the silhouette image. The remaining image may then have the pattern matching function further applied, and other patterns may in turn be identified. Such an iterative process may in some examples permit compound images to be partitioned and counted with acceptable accuracy, and may further allow identification of broken pieces of units. The process may further identify and tag extraneous items—that is, items not having geometric patterns corresponding to units or combinations of units—with these omitted from a count. This process may be termed discrimination between patterns.

In some examples, the processor 66 may identify touching or overlapping units, allowing counting of units within multi-unit groups in some configurations and directing an agent to scatter such groups where likelihood of accurate counting is unacceptably low. A limit on such capability may occur where units such as flat-faced pills-squat cylinders—are stacked substantially perpendicularly to the local view axis of the imaging device. Such configurations may reduce the efficiency of the counting machine despite use of procedures outlined above. Additional procedures such as the one discussed below may restore efficiency.

In some examples, the processor 66 acquires a unit count over multiple sample cycles, during which interval the agent may add units to the tray 20. The processor 66 compares unit counts in successive sample cycles, with successive counts typically increasing in value. Where a final count target is known, the agent may need to add or remove units after a stable count is established. Under some conditions, a count may be observed to decrease anomalously, which may result from stacking. A processor 66 detecting such a condition may present a message to the agent directing that the units be spread, and may further indicate one or more regions on the tray 20 as appropriate.

Figure 7:
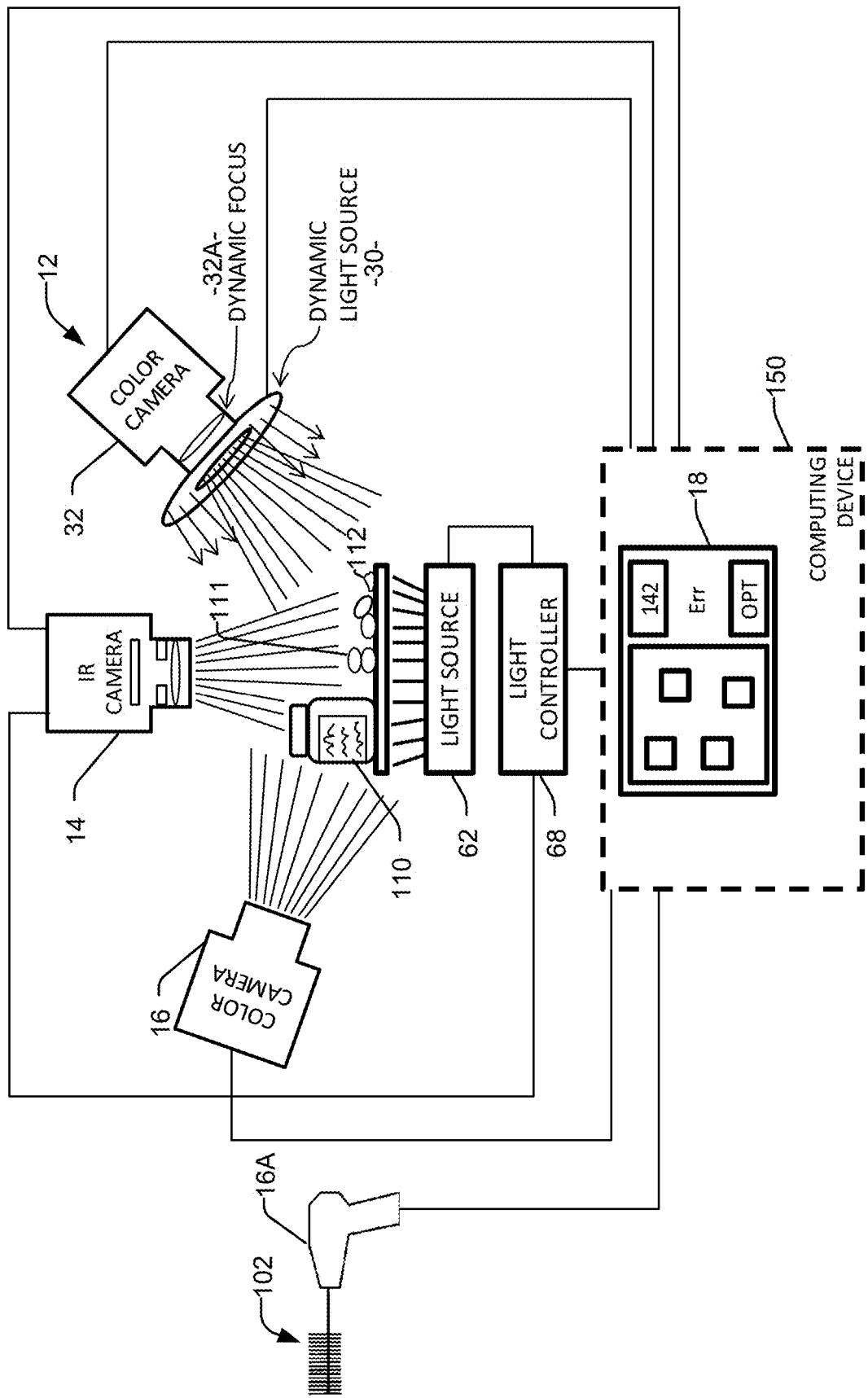
FIG. 7 illustrates another block diagram of an example image based counting system, in accordance with aspects of this disclosure.

FIG. 7 illustrates another block diagram of an example image based counting system, which is controlled by a computing device 150. In some examples, the system could be a standalone unit with the computing device 150 and user interface 18 fully integrated with the system, whereas in other examples the computing device 150 and/or the user interface 18 are connectable to the system components.

Figure 8:
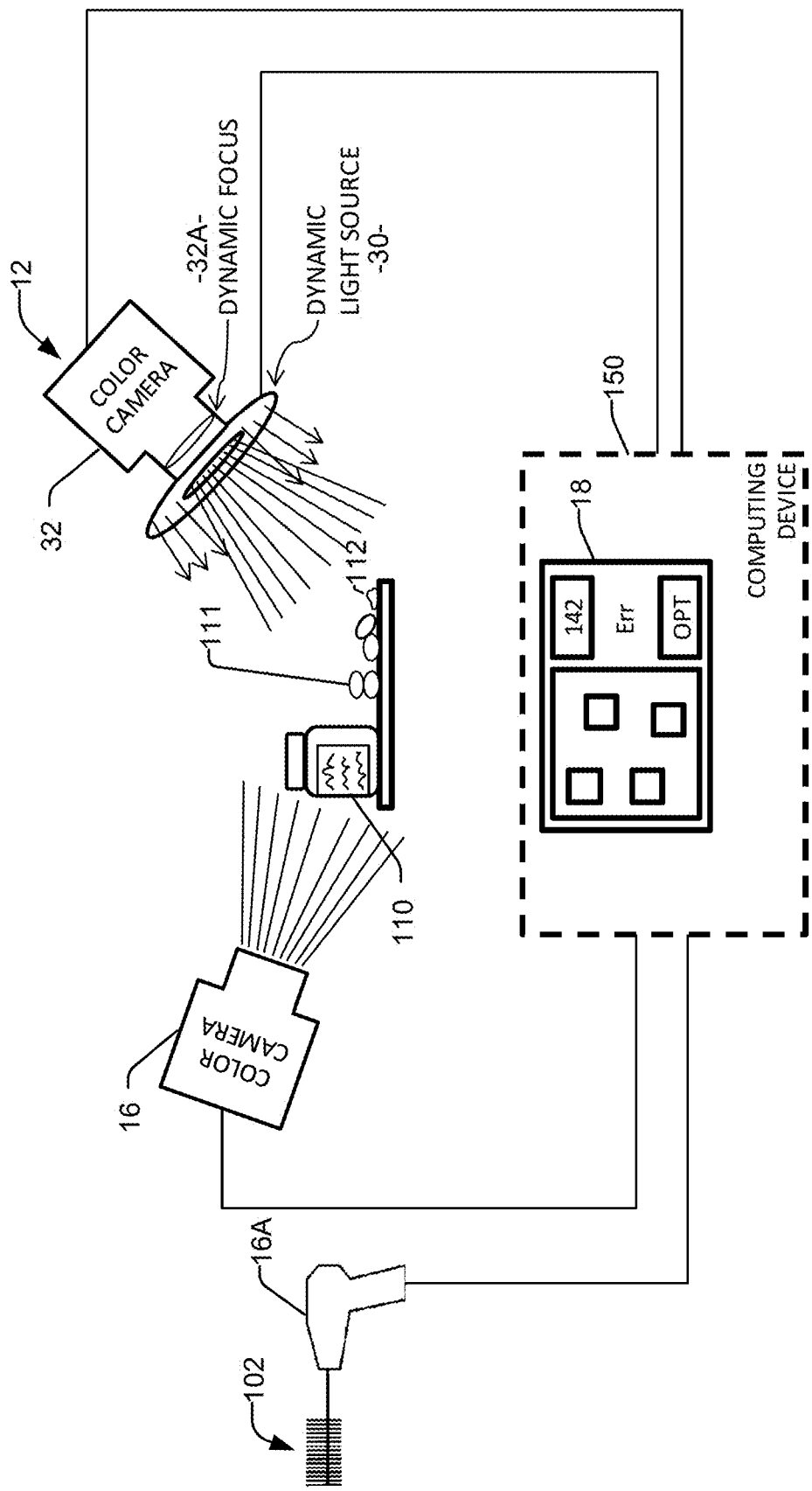
FIG. 8 illustrates yet another block diagram of an example image based counting system, in accordance with aspects of this disclosure.

FIG. 8 illustrates another block diagram of an example image based counting system. The system of FIG. 8 operates without the light controller 68 and light source 62, as well as imaging device 14. In some examples, imaging system 12 is configured to provide IR light and/or capture light in the IR range. In some examples, the system is limited to providing white light from the LEDs 30A, the light from which is captured by imaging devices 16 and 32.

Figure 9:
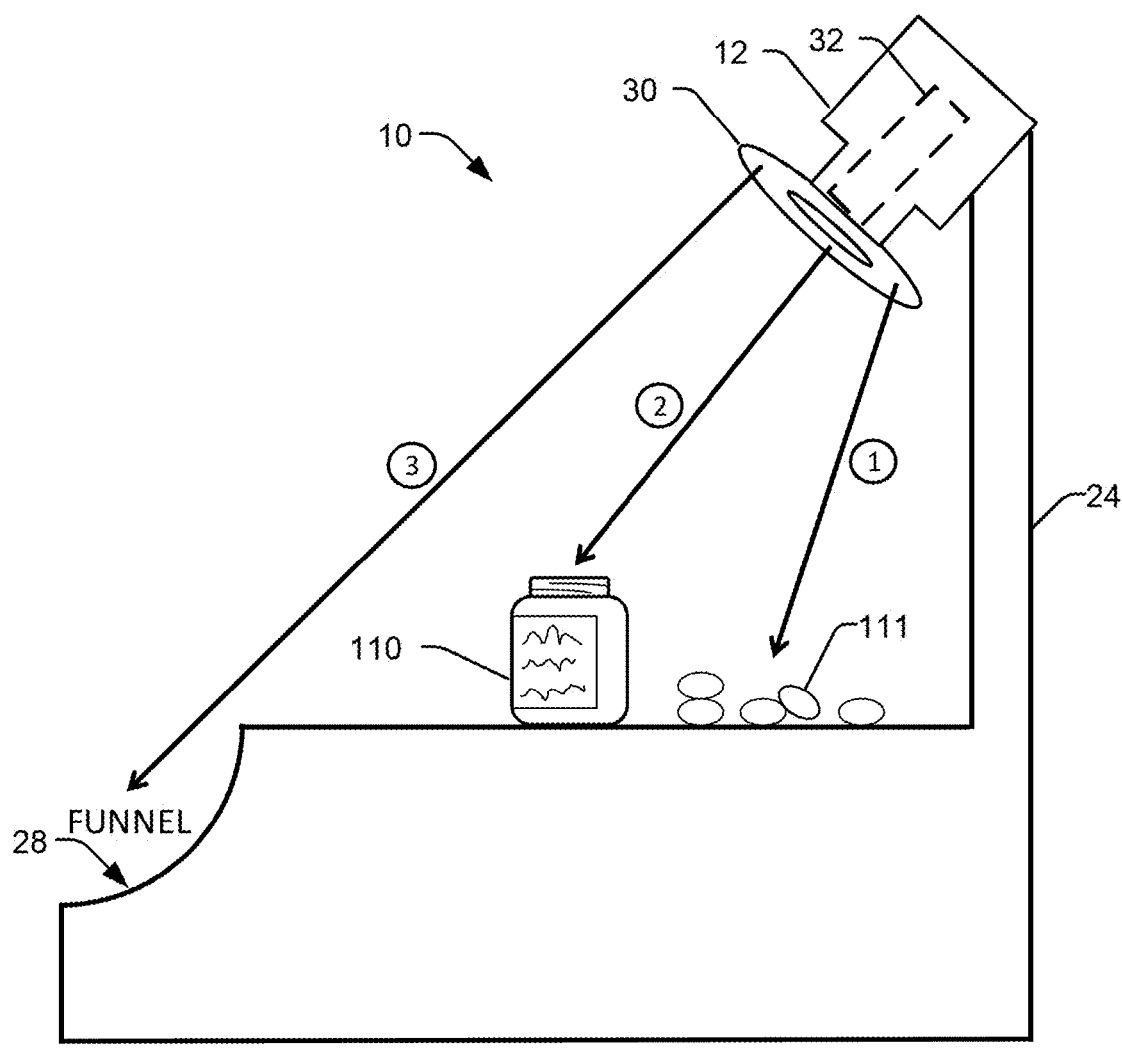
FIG. 9 illustrates an alternative view of a block diagram of an example image based counting system, in accordance with aspects of this disclosure.

FIG. 9 illustrates an alternative view of a block diagram of an example image based counting system, in accordance with aspects of this disclosure. FIG. 9 shows a side view of a functional diagram of an example system 10. The dynamic lighting is employed to vary a brightness and/or coverage area of the applied illumination, such as on the tray 20, depending on the item being imaged and/or what information is sought during the order filling process. For example, when capturing images of a plurality of pills 111 on the tray 20, indicated with a number 1, the lighting effect is adjusted to provide the lighting evenly across the tray (e.g., avoid "hotspots" with intense light, as well as avoiding darker areas with too little light). In some examples, when containers for the items are being imaged, the lighting can be increased to provide a spotlight effect to focus illumination on the pills within the container, as indicated with a number 2.

During the order filling process, the lighting can be adjusted to focus light on the funnel 28, located at an outward facing portion of the system 10, in order to image, identify, and/analyze items within the funnel 28, as indicated with a number 3. This additional analysis further aids in prevention of errors due to cross-contamination between prescriptions.

Additionally or alternatively, the one or more imaging devices can employ adjustable and/or auto-focus features to expand the imaging capabilities. As disclosed herein, the imaging device 32 includes a factory-programmed fixed-focus setting for imaging static images at a fixed distance or within a distance threshold, such as pills located on the tray 20. The imaging device 32 also employs an auto-focus feature for imaging a variety of features. The ability for the camera to adjust the focus for image capture provides for views of the container 110 (e.g., differently sized containers, which may contain a variety of marking and/or sized text, and may be located at variable distances from the imaging system 12), and at different fixed and/or variable focus settings imaging the funnel 28, such as to image and detect pills or other items that were not properly dispensed. Thus, the fixed and variable focus capability of the system 10 provides consistent, high-resolution images of the items/pills, while providing flexibly for the system 10 to capture images of larger unit-of-use items placed on the tray or located away from the tray.

In some examples, the system 10 further includes a light sensor to detect ambient lighting conditions. Information from the sensor can be provided to the computing device, which can control the dynamic lighting to compensate for varying ambient lighting conditions. This additional information aids in applying a desired amount of light to properly image the items to be counted by ensuring the lighting level is neither too high nor too low for accurate imaging and detection.

Figure 10:
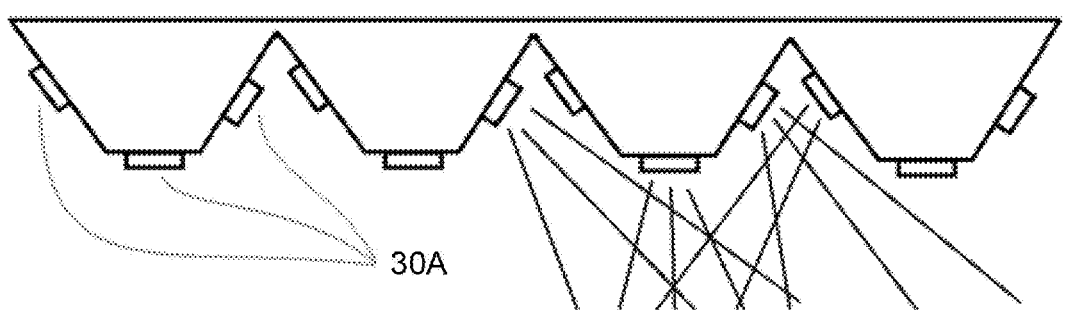
FIG. 10 illustrates a block diagram of an example light source for an image based counting system, in accordance with aspects of this disclosure.

FIG. 10 illustrates a block diagram of an example light source for an image based counting system, in accordance with aspects of this disclosure. Utilizing a rigid-flex hybrid circuit board, and example of which is shown in FIG. 4, imaging device 30 includes a plurality of LEDs 30A. The LEDs 30A are arranged to provide illumination to various locations on the system 10, as well as generate various illumination patterns. In some examples, the LEDs 30A can be controlled by a processor to provide different and/or dynamic brightness levels, color profiles, illumination effects, and/or focus lighting at different locations.

For example, one or more LEDs 30A or LED systems can be employed, arranged at various locations on the system or in the vicinity of the system to provide lighting for image capture. As shown, the LED are angled to provide incident light at a number of angles. This limits the number of shadows and/or bright spots at the imaging surface. This arrangement and/or control provides multidimensional lighting to highlight pill imprints and/or markings.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

The invention claimed is:

1. A method of determining one or more properties of one or more items employing an image based counting system comprising:
    illuminating, via one or more lighting sources, one or more items having a plurality of illumination characteristics;
    capturing a first image via a first imaging device with adjustable focus of the one or more items from a first angle;
    capturing second image via a second imaging device of the one or more items from a second angle;
    receiving images of the illuminated items from the first and second imaging devices at a control circuitry;
    generating a composite image comprising the first and second properties;
    identifying a characteristic of the plurality of illumination characteristics of the composite image at the control circuitry;
    comparing the characteristic to a list of illumination characteristics that corresponds to a property of the one or more items at the control circuitry;
    determining one or more properties of the one or more items based on the comparison at the control circuitry; and
    generate an alert associated with the one or more properties at the control circuitry.

2. The method of claim 1, wherein application of the light can vary by changing an angle of incidence of the light, a color of the light, an intensity of the light, or a spot size of the light to illuminate the one or more properties of the one or more items.

3. The method of claim 2, wherein the one or more properties comprises a color, a shape, a size, a printed or embedded marking, or an orientation of the one or more items.

4. The method of claim 2, wherein the first or second imaging devices further comprising an optical filter to modify illumination received at the one or more imaging devices, the optical filter designed to accentuate different properties of the one or more properties of the one or more items.

5. The method of claim 2, wherein the items are illuminated and imaged to create or eliminate shadows, highlight or subdue color contrast, to provide different properties of the one or more properties of the one or more items.

6. The method of claim 1, wherein the one or more lighting sources are configured to illuminate the one or more items with a monochromatic light or polychromatic light.

7. The method of claim 1, wherein the one or more lighting sources are configured to provide light in one or more patterns or sequences.

8. The method of claim 1, wherein the one or more items comprise one or more of a pill, a capsule, or a pharmaceutical unit.

9. The method of claim 1, further comprising:
    capturing the images of the one or more items in a time series; and
    generating a video representing the images in a multi-frame sequence.

10. The method of claim 1, wherein the first image having a first property of the one or more properties and the second image having a second property of the one or more properties are incorporated into a composite image comprising the first and second properties.

11. The method of claim 1, wherein the first imaging device captures images of the one or more items in a first wavelength and the second imaging device captures images of the one or more items from a second wavelength.

12. An image based counting system comprising:
    one or more lighting sources configured to illuminate one or more items having a plurality of illumination characteristics;
    one or more imaging devices comprising an adjustable focus lens to capture images of the illuminated platform and the one or more items; and
    a control circuitry configured to:
        receive first and second images of the illuminated items from the one or more imaging devices, wherein the first image having a first property of the one or more properties and the second image having a second property of the one or more properties;
        generate a composite image comprising the first and second properties;
        identify a characteristic of the plurality of illumination characteristics based on the composite image;
        compare the characteristic to a list of illumination characteristics that corresponds to a property of the one or more items;
        determine one or more properties of the one or more items based on the comparison; and
        generate an alert associated with the one or more properties.

13. The system of claim 12, wherein the alert comprises controlling a screen to display of an image of the one or more properties of the pill.

14. The system of claim 12, wherein the control circuitry is further configured to:
    compare the captured images against one or more reference images, and
    control a focus of the one or more imaging devices based on the comparison.

15. The system of claim 12, wherein the controller is further configured to control the lens to capture images at a first preprogrammed fixed-focus setting corresponding to a location on the platform.

16. The system of claim 15, further comprising a dispensing funnel, wherein the controller is further configured to control the lens to capture images at a second preprogrammed fixed-focus setting corresponding to a location on the dispensing funnel.

17. The system of claim 12, wherein the controller is further configured to control the lens to adjust the focus of the lens to capture images at a plurality of variable focal distances.

18. The system of claim 12, wherein the plurality of illumination characteristics comprises one or more of an intensity, a wavelength, a distribution pattern, a color, a shape, a size, a printed or embedded marking, or an orientation.

* * * * *